United States Patent
Wiggs

(10) Patent No.: US 7,856,839 B2
(45) Date of Patent: Dec. 28, 2010

(54) DIRECT EXCHANGE GEOTHERMAL HEATING/COOLING SYSTEM SUB-SURFACE TUBING INSTALLATION WITH SUPPLEMENTAL SUB-SURFACE TUBING CONFIGURATION

(75) Inventor: B. Ryland Wiggs, Franklin, TN (US)

(73) Assignee: Earth To Air Systems, LLC, Franklin, TN (US)

( * ) Notice: Subject to any disclaimer, the term of this patent is extended or adjusted under 35 U.S.C. 154(b) by 200 days.

(21) Appl. No.: 11/637,256

(22) Filed: Dec. 11, 2006

(65) Prior Publication Data

US 2007/0089447 A1     Apr. 26, 2007

Related U.S. Application Data

(63) Continuation-in-part of application No. 10/874,018, filed on Jun. 22, 2004, now Pat. No. 7,146,823.

(51) Int. Cl.
*F25D 23/12*     (2006.01)

(52) U.S. Cl. .......................................... 62/260; 165/45
(58) Field of Classification Search ................... 62/260; 165/45
See application file for complete search history.

(56) References Cited

U.S. PATENT DOCUMENTS

| | | | |
|---|---|---|---|
| 2,503,456 A | 4/1950 | Smith | |
| 4,158,291 A | 6/1979 | Jones | |
| 4,169,554 A | 10/1979 | Camp | |
| 4,205,718 A | 6/1980 | Balch | |
| 4,224,805 A | 9/1980 | Rothwell | |
| 4,257,239 A | 3/1981 | Partin et al. | |
| 4,286,651 A | 9/1981 | Steiger et al. | |
| 4,290,266 A | 9/1981 | Twite et al. | |
| 4,325,228 A | 4/1982 | Wolf | |
| 4,375,831 A | 3/1983 | Downing, Jr. | |
| 4,378,787 A | 4/1983 | Fleischmann | |
| 4,383,419 A | 5/1983 | Bottum | |
| 4,392,532 A | 7/1983 | Raggio | |
| 4,448,238 A | 5/1984 | Singleton, Jr. et al. | |
| 4,536,765 A | 8/1985 | Kaminski | |
| 4,538,673 A | 9/1985 | Partin et al. | |
| 4,544,021 A | 10/1985 | Barrett | |
| 4,715,429 A | 12/1987 | Mogensen | |
| 4,741,388 A | 5/1988 | Kuriowa et al. | |
| 4,867,229 A | 9/1989 | Mogensen | |
| 4,911,229 A * | 3/1990 | McElroy ...................... | 165/45 |
| 4,993,483 A | 2/1991 | Harris | |
| 5,025,634 A | 6/1991 | Dressler | |
| 5,025,641 A | 6/1991 | Broadhurst | |
| 5,038,580 A | 8/1991 | Hart | |
| 5,136,855 A | 8/1992 | Lenarduzzi | |
| 5,224,357 A * | 7/1993 | Galiyano et al. .............. | 62/260 |
| 5,277,032 A | 1/1994 | See et al. | |

(Continued)

*Primary Examiner*—Mohammad M Ali
(74) *Attorney, Agent, or Firm*—Miller, Matthias & Hull LLP

(57) ABSTRACT

A sub-surface tubing arrangement for use in a direct exchange (DX) geothermal heating/cooling system includes a primary sub-surface liquid refrigerant transport line, a primary sub-surface vapor refrigerant transport line, at least one sub-surface heat exchange refrigerant transport line functionally connecting the primary sub-surface liquid refrigerant transport line to the primary sub-surface vapor refrigerant transport line, and either vertical or horizontal supplemental sub-surface refrigerant line connected to one of the primary sub-surface liquid or vapor refrigerant transport lines.

19 Claims, 2 Drawing Sheets

U.S. PATENT DOCUMENTS

| | | |
|---|---|---|
| 5,313,804 A | 5/1994 | Kaye |
| 5,383,337 A | 1/1995 | Baker |
| 5,388,419 A | 2/1995 | Kaye |
| 5,419,135 A | 5/1995 | Wiggs |
| 5,461,876 A * | 10/1995 | Dressler ................... 62/160 |
| 5,477,914 A | 12/1995 | Rawlings |
| 5,533,355 A | 7/1996 | Rawlings |
| 5,560,220 A | 10/1996 | Cochran |
| 5,561,985 A | 10/1996 | Cochran |
| 5,564,282 A * | 10/1996 | Kaye ...................... 62/160 |
| 5,623,986 A | 4/1997 | Wiggs |
| 5,651,265 A | 7/1997 | Grenier |
| 5,671,608 A | 9/1997 | Wiggs et al. |
| 5,706,888 A | 1/1998 | Ambs et al. |
| 5,725,047 A | 3/1998 | Lopez |
| 5,738,164 A | 4/1998 | Hildebrand |
| 5,758,514 A | 6/1998 | Genung |
| 5,771,700 A | 6/1998 | Cochran |
| 5,816,314 A * | 10/1998 | Wiggs et al. ............... 165/45 |
| 5,875,644 A | 3/1999 | Ambs et al. |
| 5,937,665 A | 8/1999 | Kiessel et al. |
| 5,937,934 A | 8/1999 | Hildebrand |
| 5,941,238 A | 8/1999 | Tracy |
| 5,946,928 A | 9/1999 | Wiggs |
| 6,041,862 A | 3/2000 | Amerman |
| 6,138,744 A | 10/2000 | Coffee |
| 6,212,896 B1 | 4/2001 | Genung |
| 6,227,003 B1 | 5/2001 | Smolinsky |
| 6,251,179 B1 * | 6/2001 | Allan ..................... 106/719 |
| 6,276,438 B1 | 8/2001 | Amerman et al. |
| 6,293,108 B1 * | 9/2001 | Cho et al. ................... 62/5 |
| 6,354,097 B1 | 3/2002 | Schuster |
| 6,390,183 B2 | 5/2002 | Aoyagi et al. |
| 6,450,247 B1 | 9/2002 | Raff |
| 6,521,459 B1 | 2/2003 | Schooley et al. |
| 6,581,404 B2 | 6/2003 | Komatsubara et al. |
| 6,615,601 B1 | 9/2003 | Wiggs |
| 6,751,974 B1 * | 6/2004 | Wiggs ..................... 62/260 |
| 6,892,522 B2 | 5/2005 | Brasz et al. |
| 6,932,149 B2 | 8/2005 | Wiggs |
| 7,146,823 B1 | 12/2006 | Wiggs |
| 2004/0108096 A1 | 6/2004 | Janssen |

\* cited by examiner

DIRECT EXCHANGE GEOTHERMAL HEATING/COOLING SYSTEM SUB-SURFACE TUBING INSTALLATION WITH SUPPLEMENTAL SUB-SURFACE TUBING CONFIGURATION

CROSS-REFERENCES TO RELATED APPLICATIONS

This application is a Continuation-In-Part application which claims benefit of U.S. patent application Ser. No. 10/874,018 filed Jun. 22, 2004, now U.S. Pat. No. 7,146,823, entitled "Horizontal and Vertical Direct Exchange Heating/Cooling System Sub-Surface Tubing Installation Means" which is hereby incorporated by reference.

A portion of the disclosure of this patent document contains material that is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates to a geothermal "direct exchange" ("DX") heating/cooling system, which is also commonly referred to as a "direct expansion" heating/cooling system, comprising various design improvements.

Conventional and older design geothermal ground source/water source heat exchange systems typically utilize liquid-filled closed loops of tubing (typically approximately ¼ inch wall polyethylene tubing) buried in the ground, or submerged in a body of water, so as to either absorb heat from, or to reject heat into, the naturally occurring geothermal mass and/or water surrounding the buried or submerged liquid transport tubing. The tubing loop, which is typically filled with water and optional antifreeze and rust inhibitors, is extended to the surface. A water pump is then used to circulate one of the naturally warmed and naturally cooled liquid to a liquid to refrigerant heat exchange means.

The transfer of geothermal heat to or from the ground to the liquid in the plastic piping is a first heat exchange step. Via a second heat exchange step, a refrigerant heat pump system is utilized to transfer heat to or from the liquid in the plastic pipe to a refrigerant. Finally, via a third heat exchange step, an interior air handler (comprised of finned tubing and a fan) is typically utilized to transfer heat to or from the refrigerant to heat or cool interior air space.

Newer design geothermal DX heat exchange systems, where the refrigerant fluid transport lines are placed directly in the sub-surface ground and/or water, typically circulate a refrigerant fluid, such as R-22, the like, in sub-surface refrigerant lines, typically comprised of copper tubing, to transfer geothermal heat to or from the sub-surface elements via a first heat exchange step. DX systems only require a second heat exchange step to transfer heat to or from the interior air space, typically by means of an interior air handler. Consequently, DX systems are generally more efficient than water-source systems because fewer heat exchange steps are required and because no water pump energy expenditure is necessary. Further, because copper is a better heat conductor than most plastics, and because the refrigerant fluid circulating within the copper tubing of a DX system generally has a greater temperature differential with the surrounding ground than the water circulating within the plastic tubing of a water-source system, generally less excavation and drilling is required (and installation costs are typically lower) with a DX system than with a water-source system.

While most in-ground/in-water DX heat exchange designs are feasible, various improvements have been developed intended to enhance overall system operational efficiencies. Several such design improvements, particularly in direct expansion/direct exchange geothermal heat pump systems, are taught in U.S. Pat. No. 5,623,986 to Wiggs; in U.S. Pat. No. 5,816,314 to Wiggs, et al.; in U.S. Pat. No. 5,946,928 to Wiggs; and in U.S. Pat. No. 6,615,601 B1 to Wiggs, the disclosures of which are incorporated herein by reference. Such disclosures encompass both horizontally and vertically oriented sub-surface heat geothermal heat exchange means.

DX heating/cooling systems have three primary objectives. The first objective is to provide the greatest possible operational efficiencies. This directly translates into providing the lowest possible heating/cooling operational costs, as well as other advantages, such as, for example, materially assisting in reducing peaking concerns for utility companies. The second objective is to operate in an environmentally safe manner via the utilization of environmentally safe components and fluids. The third objective is to operate for long periods of time absent the need for any significant maintenance/repair, thereby materially reducing servicing and replacement costs over other conventional system designs.

Historically, DX heating/cooling systems, even though more efficient than other conventional heating/cooling systems, have experienced practical installation limitations created by the relatively large surface land areas necessary to accommodate the sub-surface heat exchange tubing. For example, with horizontal "pit" systems, a typical land area of 500 square feet per ton of system design capacity was required in first generation designs to accommodate a shallow (within 10 feet of the surface) matrix of multiple, distributed, copper heat exchange tubes. Further, in various vertically oriented first generation DX system designs, about one to two 50 foot to 100 foot (maximum) depth wells/boreholes per ton of system design capacity, with each well spaced at least about 20 feet apart, and with each well containing an individual refrigerant transport tubing loop, were required. Such requisite surface areas effectively precluded system applications in many commercial and/or high density residential applications. An improvement over such predecessor designs was taught by Wiggs, via the utilization of various DX system design features that enabled a DX system to operate within wells/boreholes that were about 300 deep, thereby materially reducing the necessary surface area land requirements for a DX system.

However, over the years, two common additional problems have been encountered with pit style DX systems, and with vertical well style DX systems.

First, a common problem with pit style systems is the easy ability for the geothermal heat exchange field to become "overstressed", particularly in the cooing mode. An overstressed horizontal pit type DX system, which is well understood by those skilled in the art, can take weeks to return to normal temperature conditions if severely overstressed in the cooling mode. It is an object of the subject invention to provide a solution to this subject problem without the need for additional significant land surface area to increase the size of the horizontal heat exchange field, comprised of an array of tubing typically spaced 2 to 12 inches apart.

Second, a common problem with vertical well type DX systems is the periodic occurrence of the borehole partially becoming filled up with debris from the surface accidentally knocked into the hole, or with a partially collapsing wall depositing debris into the bottom of the hole, or with mud from a mud seam leaking mud, or the like, into the bottom of the well/borehole, or with debris being knocked into the bottom of the well during the actual sub-surface refrigerant transport, vertically inclined, geothermal heat exchange tubing/loop installation. A vertically inclined DX system geothermal heat transfer loop is well understood by those skilled in the art. Such debris is typically not discovered until the tubing cannot be extended to the full intended and originally drilled depth. It is an object of this invention to provide a solution to this somewhat frequent concern without having to completely remove the mostly inserted heat exchange tubing, and re-drilling the borehole to clean it out, which is both time-consuming and expensive.

A third problem common to the above DX system designs is a sub-surface suction line pressure loss, which can impair system operational efficiencies.

The present invention provides a solution to these preferable objectives, as hereinafter more fully described.

BRIEF SUMMARY OF THE INVENTION

The subject invention primarily relates to the provision of a means to improve upon earlier and former DX system technologies, so as to provide a solution to the commonly encountered field "overstressing" problem in a DX pit style system, particularly in the cooling mode, as well as a means of increasing overall system operational efficiencies, and to provide a solution to the common problem of debris in the bottom of a DX vertical well type system, both of which pit and well DX systems are well understood by those skilled in the art. Additionally, the present invention has an objective of providing a solution to excessive sub-surface suction line pressure losses in the subject DX system applications, particularly during the cooling mode of system operation. The present invention provides a solution to these preferable objectives as follows:

In a pit style DX system, an array of refrigerant transport tubing, typically comprised of ¼ inch O.D., refrigerant grade, copper tubing, or the like, is placed within a pit (typically excavated about 4 or 5 feet deep, but usually at least 1 foot below the frost line in the geographic area of installation) with an area designed at about 500 to 600 square feet per ton of heating/cooling system design capacity (heating/cooling design capacity is measured in tons, where 1 ton equals 12,000 BTUs, and is well understood by those skilled in the art). Thus, a large surface area is required, which may often take up most all available yard space. Also, because the excavation is relatively near the ground surface, bedrock is usually not encountered, and soils containing poorly heat conductive clays are common. Pit style systems are easily overstressed when doors or windows are accidentally left open, when outdoor temperatures exceed design levels, or when large groups of people are entertained. The overstressing problem is most severe in the cooling mode, as more land surface area is required to dissipate heat in a DX system than to provide heat. An overstressed pit system can takes weeks to cool down so as to enable the occupant to enjoy satisfactory air-conditioning.

While one seemingly obvious solution to an overstressed pit style system would be to increase the pit size and install additional sub-surface horizontally oriented heat transfer tubing, this poses several problems. First, there may not be adequate available land surface area. Second, if one supplies too much tubing for a particularly sized existing compressor and air handler unit, the design refrigerant flow and design phase change in the field can become impaired, and operational efficiencies can suffer. A solution to such a problem is to install a liquid line refrigerant transport loop in a vertically inclined borehole. (A vapor line refrigerant transport loop cannot efficiently be installed in conjunction with a pit system because a phase change from vapor to liquid in a vertically inclined vapor line presents a problem with vertical lift/head pressure of the liquid through the larger diameter of the vapor line during cooling mode operation, which cooling mode is the primary concern.)

Such a supplemental liquid line refrigerant transport loop in a vertically inclined borehole provides a means to take the load off a traditionally designed pit system during overstressed conditions, particularly in the cooling mode, all while requiring only as little additional surface area as a 5 or 6 inch diameter borehole. Depending on the tonnage overload during stressed conditions, the supplemental liquid refrigerant transport line should preferably be installed within a loop that is at least 80 feet deep, and preferably at least 120 feet deep, per ton of stress system overload. One of the supplemental lines in the well loop should preferably be insulated at least 25% of the way down from the top, and preferably at least 75% of the way down from the top, so as to prevent a "short-circuiting" effect of the warm liquid line being within the same borehole as the cool liquid line (whether operating in either the cooling or the heating mode).

Additionally, the empty annular space within the borehole, after the insulated liquid line loop has been installed, should be filled with a heat conductive fill material, such as a preferable Grout 111 mix. Grout 111, which is well understood by those skilled in the art, is a cementitious grout that has a very high heat conductivity rate of 1.4 BTUs/Ft. Hr. Degree F., is shrink resistant, is crack resistant, and helps to prevent potential sub-surface and above-surface contaminants from entering the ground's adjacent sub-surface strata. In most residential and light commercial applications, testing has shown that the size of the supplemental liquid refrigerant transport line should preferably vary between a ⅜ inch O.D. and a ½ inch O.D. size, with a 0.03 inch wall thickness, depending on the size of the system's compressor. Preferably a 1 ton through a 2.5 ton compressor should utilize a ⅜ inch O.D., plus or minus 20%, supplemental liquid refrigerant transport line size, and a compressor larger than 2.5 tons, up to 7.5 tons, should use a ½ inch O.D., plus or minus 20%, line size for optimal system operation in such a vertically oriented supplemental liquid line design.

In addition to being available to help relieve overstressed DX pit system designs, the addition of a supplemental vertical well liquid line loop, as a matter of standard practice, will increase overall system operational efficiencies because of the exposure of the circulating sub-surface heat exchange refrigerant to additional ground area at the more steady-state temperatures found at depths farther from the ground surface, which are not subject to the affects of widely fluctuating atmospheric temperature conditions. Generally, the ground temperature is relatively unaffected by atmospheric temperature changes at a depth of about 65.6 feet.

The common problem of vertical well type DX systems is that of debris accumulating in the bottom of the well after drilling, but before insertion of the refrigerant transport heat exchange loop. A vertical well type DX system is well understood by those skilled in the art and typically is comprised of a loop in the well comprised of an insulated smaller primary refrigerant transport liquid line, operably connected, by means of at least one of a shorter horizontal segment and a U bend, to an exposed larger primary refrigerant transport vapor line, with the remaining empty annular space within the well being filled with a heat conductive fill material, preferably comprised of Grout 111.

The common problem of vertical well type DX systems periodically becoming partially filled up with debris can be easily solved by extending the shorter vapor refrigerant transport line segment of the loop in a horizontal trench, which trench is excavated to a depth of at least one foot below the frost line in the particular geographic location, and preferably at least four below the frost line. In such an application, the extended vapor line segment installed within the mostly horizontally oriented trench should preferably be covered with at least one of powdered stone and Grout 111. Further, a perforated "soaker" hose should preferably be placed over the stone/Grout prior to backfilling, with a sealed shut distal end, and with the open end attached to at least one of the air handler's condensate drain line and a pressure water hose so as to keep the near-surface segment moist in the cooling mode of operation.

Depending on the heat conductivity rate of the near-surface ground, which is generally always less than that of the rock and/or wet ground encountered in a well system, the length of the extended vapor refrigerant transport line segment in the trench should be extended, and preferably doubled from the design length used per ton in the well.

No more than 20%, and preferably no more than 10%, of the design well depth should be placed in a supplemental trench for two reasons. One reason is that the heat transfer rate in a well is usually much better, with far less atmospheric affects upon the refrigerant transport heat transfer tubing, than that of the refrigerant transport tubing within a near-surface trench. The other reason is that, particularly when two or more wells are used to service a single compressor system, the cooling mode liquid refrigerant head pressure differential in the refrigerant loop that is materially (more than about 20%) shorter than the other loop(s) at full design depth loop(s), may tend to throw equally designed refrigerant flow rates in each respective loop off, and thereby impair system operational efficiencies.

In both such design improvements, the first improvement being comprised of a vertically oriented well loop for the primary liquid refrigerant line in a DX pit system, and the second improvement being comprised of a supplemental horizontally oriented vapor heat exchange line for a short-looped vertically oriented DX well system, the use of a refrigerant with at least a 10% greater operating pressure than that of R-22, such as R-410A, would be preferable and would enhance system operational efficiencies. Field testing has shown that higher refrigerant operational pressures (than that of commonly used R-22) offset the negative impacts of operational refrigerant transport suction line pressure losses in sub-surface heat exchange DX systems as described herein, particularly in the cooling mode of system operation, where the sub-surface refrigerant transport suction line is at least one of the smaller diameter liquid refrigerant transport lines.

BRIEF DESCRIPTION OF THE SEVERAL VIEWS OF THE DRAWINGS

There are shown in the drawings embodiments of the invention as presently preferred. It should be understood, however, that the invention is not limited to the exemplary arrangements and instrumentalities shown in the drawings, wherein.

DETAILED DESCRIPTION OF THE INVENTION

The following detailed description is of the best presently contemplated mode of carrying out the invention. The description is not intended in a limiting sense, and is made solely for the purpose of illustrating the general principles of the invention. The various features and advantages of the present invention may be more readily understood with reference to the following detailed description taken in conjunction with the accompanying drawings.

Figure 1:
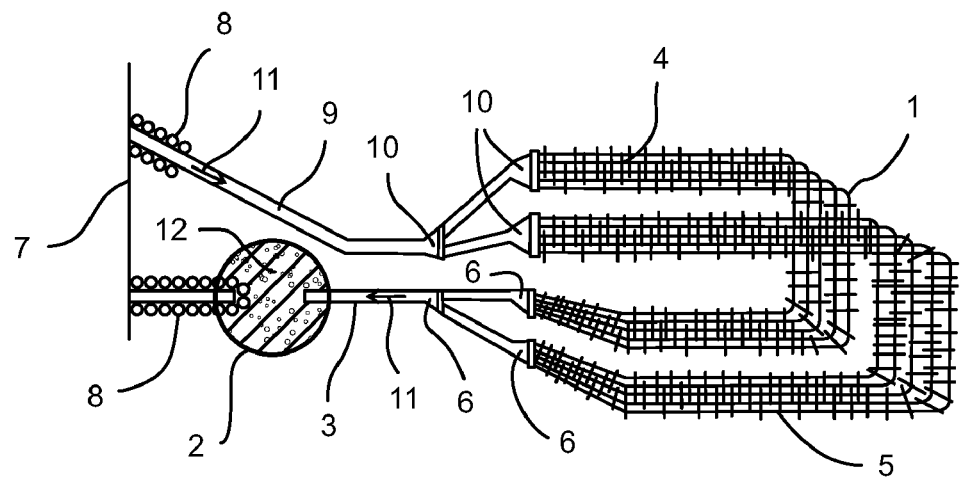
FIG. 1 is a top view of a horizontally inclined pit DX geothermal heat exchange system, in conjunction with a vertically inclined supplemental well installation for the liquid refrigerant transport line only.

One embodiment of the invention is shown in FIG. 1, not drawn to scale, which is a top view of a horizontally inclined DX geothermal heat exchange pit system 1, in conjunction with a vertically inclined supplemental well 2 installation for the single, primary, liquid refrigerant transport line 3. Typically, depending on the size of the DX system compressor (not shown herein, as same is well understood by those skilled in the art) the primary liquid line 3 is a three-eighth inch O.D, plus or minus 20%, for a one to two and one-half ton compressor, and is a one-half inch O.D., plus or minus 20%, for a compressor between two and one-half and seven and one-half tons (a compressor is well understood by those skilled in the art and is not shown herein). Here, the smaller diameter heat exchange refrigerant transport tubing/lines 4 (typically about one-quarter inch O.D. tubing 4) in the pit system 1 is comprised of tubing/lines 4 with optional fins 5 for increased geothermal heat transfer. The liquid refrigerant transport line 3 extending from the liquid line distributors 6, leading to the smaller finned 5 heat transfer tubing/lines 4 in the pit system 1, to the well 2 is un-insulated. A first vertical segment 22 of the supplemental liquid refrigerant transport loop 3', extending from at least 25% of the way into the well 2 (insulated depth not shown in this top view) from the top of the well 2 to the structure wall 7, is insulated 8. The primary vapor refrigerant transport line 9 extending from the vapor line distributors 10 to within about ten feet (not drawn to scale) of the structure wall 7 is insulated 8. Arrows 11 indicate the directional flow of the refrigerant (not shown) in the cooling mode. The remaining interior portion of the well 2 is filled with a heat conductive fill material 12, which is preferably Grout 111. Here, the supplemental liquid transport loop 3' includes first and second vertical segments 22, 23 and a horizontal or loop segment 13 that is within the well 2 is at least eighty feet deep, and preferably is at least one hundred twenty feet deep, per ton of design capacity, so as to extend into a very stable ground temperature zone. The use of a refrigerant (not shown herein) with at least a 10% greater operating pressure than that of R-22, such as R-410A, would be preferable and would enhance system operational efficiencies in this, as well as in any, DX system design.

Figure 2:
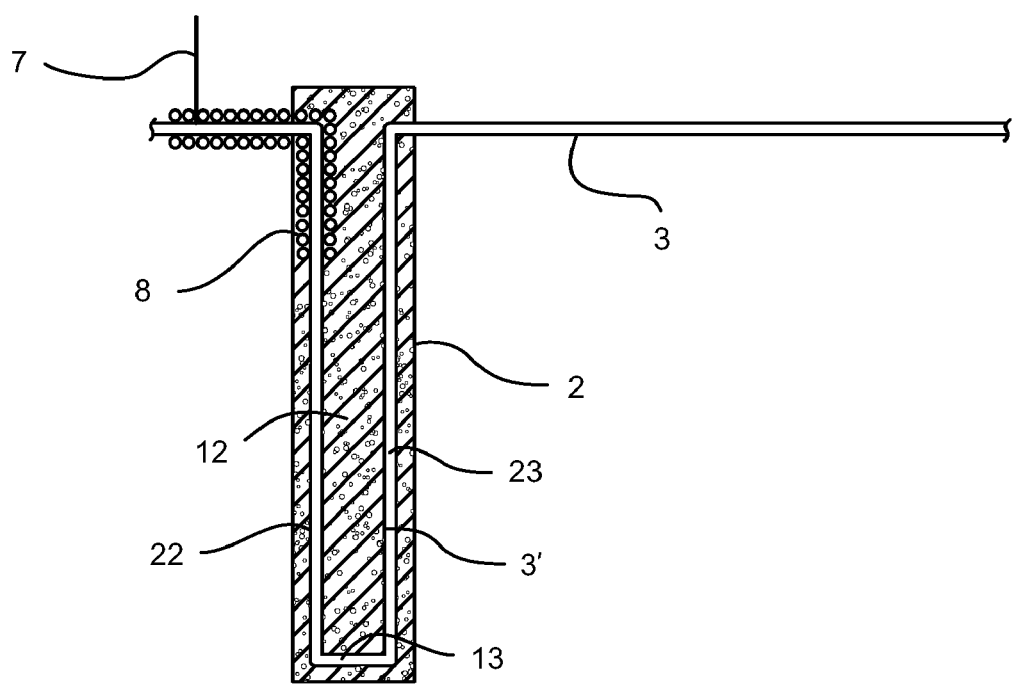
FIG. 2 is a side view of a vertically oriented well containing a supplemental liquid refrigerant transport line loop, with the well filled with a heat conductive fill material, and with at least 25% (not drawn to scale) of one of the lines in the supplemental loop being insulated.

FIG. 2 is a side view of a vertically oriented well 2 containing the supplemental liquid refrigerant transport line 3', with the well 2 filled with a heat conductive fill material 12, which fill material 12 is preferably Grout 111. At least twenty five percent (not drawn to scale) of one of the first vertical segment 22 in the supplemental loop 3' within the well 2 is insulated 8 so as to prevent a heat gain/loss "short-circuiting" effect occasioned by the proximity of the warm/cool supplemental lines 22, 23 within the loop 3' in the well 2. The insulated portion 8 of the primary liquid line 3 extends to the structure wall 7. The remaining interior portion of the well 2 is filled with a heat conductive fill material 12, which is preferably Grout 111.

Figure 3:
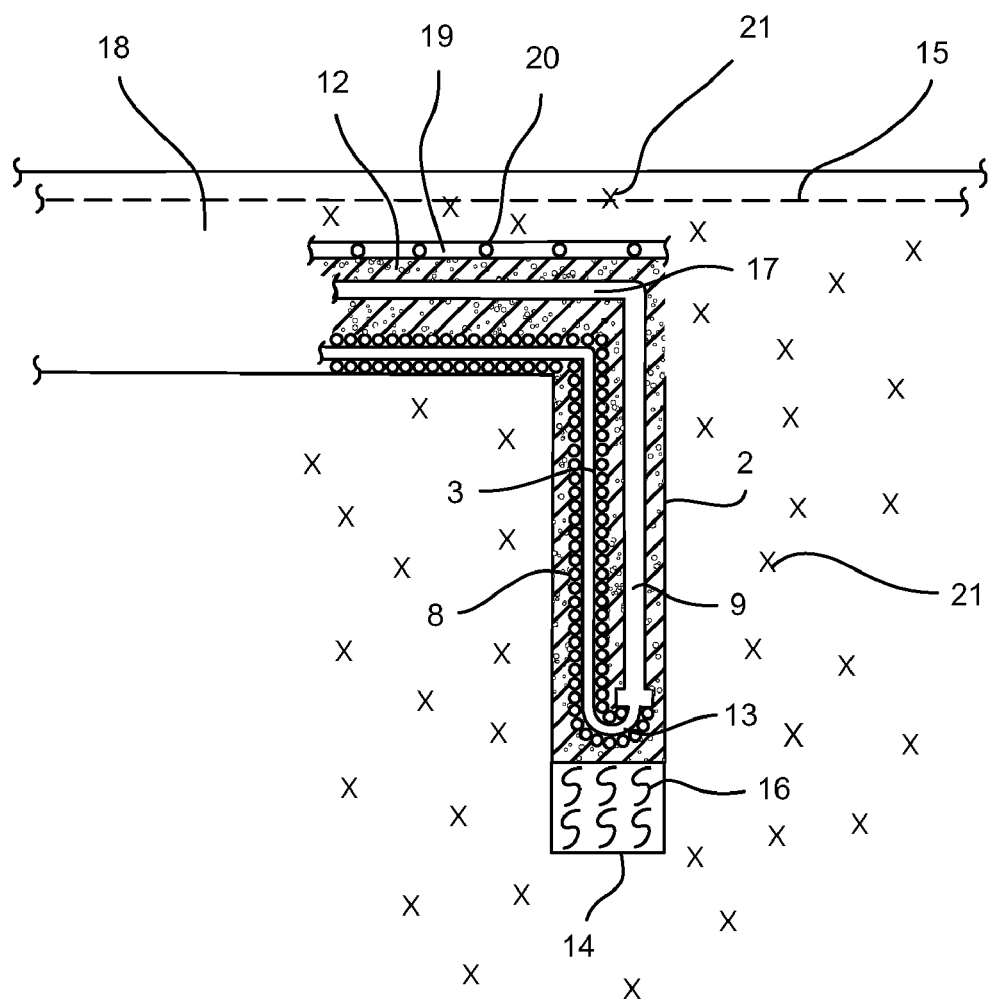
FIG. 3 is a side view of a vertically oriented deep well DX geothermal heat exchange system application, with a loop in the well comprised of an insulated smaller refrigerant transport liquid line and an exposed larger vapor refrigerant transport line, where up to 20% (not drawn to scale) of the bottom of the well is filled with debris, and where the resulting supplemental or additional segment of the exposed and un-insulated vapor refrigerant heat transfer line has been buried in a horizontally oriented trench, covered first with a heat conductive fill material, with a soaker hose placed on top, and then backfilled with earth, or the like. The trench is excavated to a depth of at least one foot (not drawn to scale) below the frost line in the particular geographic location, and preferably at least four feet below the frost line.

FIG. 3 is a side view of a vertically oriented deep well 2 DX geothermal heat exchange system application, with a liquid refrigerant transport loop 3 in the well 2 comprised of a smaller diameter insulated 8 primary refrigerant transport liquid line operably connected, by means of at least one of a shorter horizontal segment and a U-bend 13 (a U-bend 13 is shown here) to an un-insulated larger diameter primary refrigerant transport vapor line 9, where up to twenty percent (not drawn to scale), but preferably no more than ten percent, of the bottom portion 14 of the well 2 is filled with debris 16, and where the resulting supplemental segment of the exposed and un-insulated horizontally inclined vapor refrigerant heat transfer line 17 has been buried in a horizontally oriented trench 18, covered first with a heat conductive fill material 12, such as powdered stone or preferably Grout 111, with a soaker hose 19, with perforations/small holes 20 to allow water (not shown) to drain onto the heat conductive fill material 12 around the horizontally inclined vapor line 17. The soaker hose 19 is placed directly on top of the heat conductive fill material 12 around the horizontally inclined vapor line 17, and then backfilled with earth 21, or the like. The trench 18 is excavated to a depth of at least one foot (not drawn to scale) below the frost line 15 in the particular geographic location, and preferably at least four feet below the frost line 15. The use of a refrigerant (not shown herein) with at least a 10% greater operating pressure than that of R-22, such as R-410A, would be preferable and would enhance system operational efficiencies in this, as well as in any, DX system design.

Thus, although there have been described particular embodiments of the present invention of a new and useful Direct Exchange Geothermal Heating/Cooling System Sub-Surface Tubing Installation with Supplemental Sub-Surface Tubing Configuration, it is not intended that such references be construed as limitations upon the scope of this invention except as set forth in the following claims.

What is claimed is:

1. A sub-surface tubing arrangement for a direct exchange geothermal heating/cooling system used with a structure positioned adjacent a subterranean formation defining a surface, comprising:
    a primary vapor refrigerant transport line disposed no more than 10 feet below the surface and configured to transport a refrigerant vapor;
    at least one heat exchange refrigerant transport line having a first end fluidly communicating with the primary vapor refrigerant transport line and a second end, the at least one heat exchange refrigerant transport line extending substantially horizontally and being disposed no more than 10 feet below the surface, the heat exchange refrigerant transport line being configured to convert the refrigerant vapor to a refrigerant liquid;
    a primary liquid refrigerant transport line fluidly communicating with the second end of the heat exchange refrigerant transport line to receive the refrigerant liquid, the primary liquid refrigerant transport line being disposed no more than 10 feet below the surface and configured to transport the refrigerant liquid; and
    a supplemental liquid refrigerant transport loop fluidly communicating with the primary liquid refrigerant transport line, the entire supplemental liquid refrigerant transport loop being configured to transport refrigerant liquid and including a segment disposed at least 80 feet below the surface.

2. The sub-surface tubing arrangement of claim 1, in which the primary liquid refrigerant transport line extends substantially horizontally.

3. The sub-surface tubing arrangement of claim 2, in which the supplemental liquid refrigerant transport loop is positioned in a borehole defining a vertical well, and in which at least a portion of the supplemental liquid refrigerant transport loop is insulated.

4. The sub-surface tubing arrangement of claim 3, in which at least a portion of the vertical well adjacent the supplemental liquid refrigerant transport loop is filled with a heat conductive material.

5. The sub-surface tubing arrangement of claim 4, in which the heat conductive material comprises Grout 111.

6. The sub-surface tubing arrangement of claim 3, in which the supplemental liquid refrigerant transport loop comprises first and second substantially vertical segments joined by at least one of a substantially horizontal segment and a U bend, and in which an insulation layer is disposed around at least 25% of the first vertical segment.

7. The sub-surface tubing arrangement of claim 6, in which the structure defines a wall and in which each of the primary liquid refrigerant transport line and the primary vapor refrigerant transport line extends through the structure wall.

8. The sub-surface tubing arrangement of claim 7, further comprising a layer of insulation disposed around portions of each of the primary liquid refrigerant transport line and the primary vapor refrigerant transport line located proximate the structure wall.

9. The sub-surface tubing arrangement of claim 1, in which a refrigerant is disposed in the tubing, and in which, for each cooling mode set point of the direct exchange geothermal heating/cooling system, the refrigerant is maintained at an operational pressure at least 10% greater than the operational pressure for an R-22 refrigerant.

10. The sub-surface tubing arrangement of claim 9, in which a refrigerant comprises R-410A.

11. The sub-surface tubing arrangement of claim 1, in which the direct exchange system has a heating/cooling capacity of 1 to 2½ tons, and in which the supplemental liquid refrigerant transport loop has an outside diameter of ⅜", plus or minus 20%.

12. The sub-surface tubing arrangement of claim 1, in which the direct exchange system has a heating/cooling capacity of 2½ to 7½ tons, and in which the supplemental liquid refrigerant transport loop has an outside diameter of ½", plus or minus 20%.

13. A sub-surface tubing arrangement for a direct exchange geothermal heating/cooling system used with a structure positioned adjacent a subterranean formation defining a surface, comprising:
  a horizontal trench located within 10 feet of the surface;
  a vertical well extending downwardly from the trench;
  a primary vapor refrigerant transport line disposed in the vertical well and having an upper first end and a lower second end, the primary vapor refrigerant transport line being configured to transport a refrigerant vapor;
  a primary liquid refrigerant transport line having a first end fluidly communicating with the second end of the primary vapor refrigerant transport line, the primary liquid refrigerant transport line being disposed in the vertical well and having a segment located at least 80 feet below the surface; and
  a supplemental vapor refrigerant transport line disposed in the trench and extending substantially horizontally, the supplemental vapor refrigerant transport line having a first end fluidly communicating with the second end of the primary vapor refrigerant transport line and configured to transport the refrigerant vapor.

14. The sub-surface tubing arrangement of claim 13, in which a layer of insulation is disposed around at least a portion of the primary refrigerant transport line, and in which the primary refrigerant vapor line is not insulated.

15. The sub-surface tubing arrangement of claim 14, in which the supplemental vapor refrigerant transport line is disposed in a heat conductive fill material.

16. The sub-surface tubing arrangement of claim 15, in which the heat conductive fill material comprises Grout 111.

17. The sub-surface tubing arrangement of claim 15, further comprising a hose disposed in the trench and above the heat conductive fill material, the hose including a plurality of holes sized to permit water to exit the hose.

18. The sub-surface tubing arrangement of claim 13, in which a refrigerant is disposed in the tubing, and in which, for each cooling mode set point of the direct exchange geothermal heating/cooling system, the refrigerant is maintained at an operational pressure at least 10% greater than the operational pressure for an R-22 refrigerant.

19. The sub-surface tubing arrangement of claim 18, in which the refrigerant comprises R-410A.

* * * * *